April 4, 1939.  A. L. ROSENMUND  2,153,007
CLUTCH MECHANISM
Original Filed Oct. 3, 1934   2 Sheets-Sheet 1
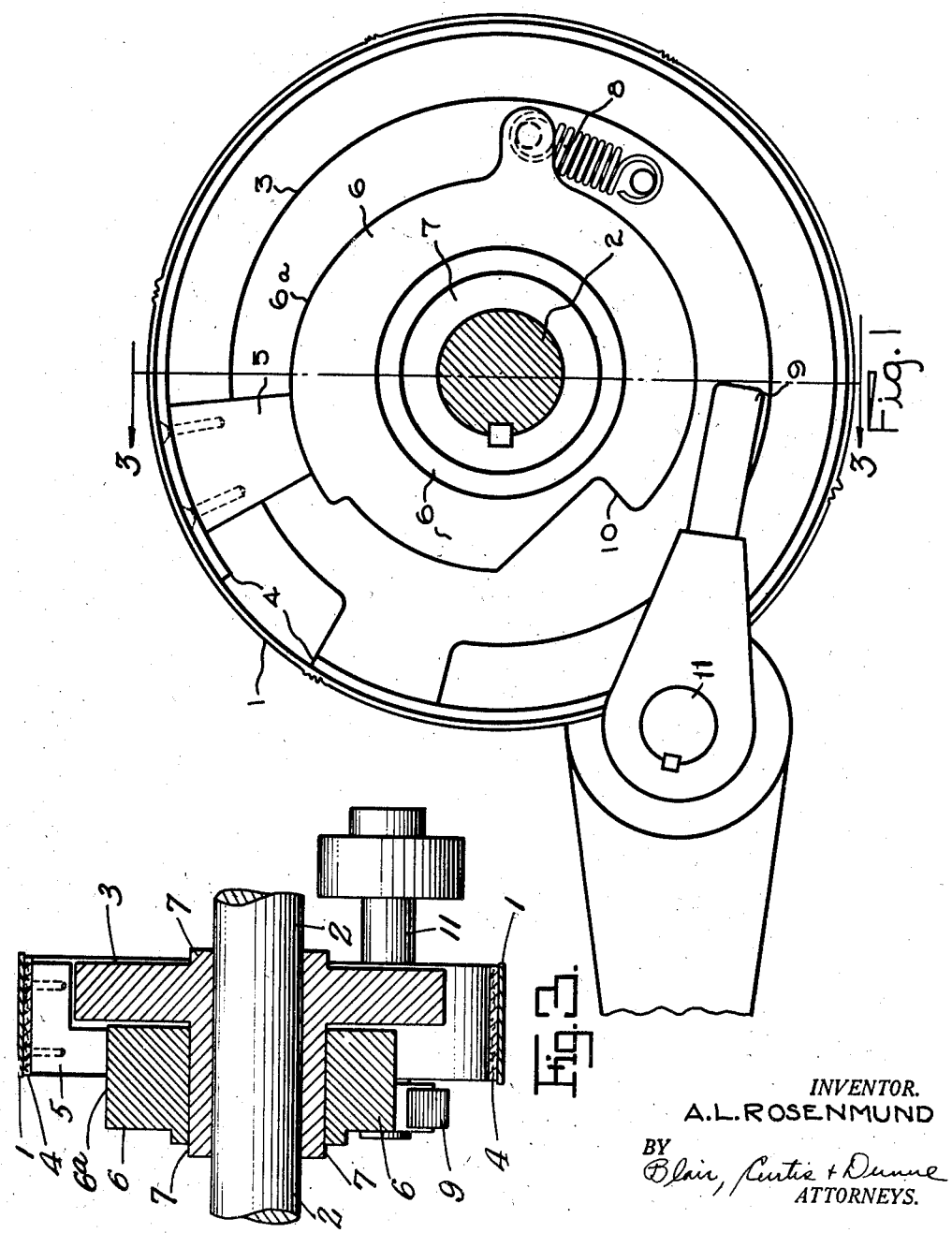
INVENTOR.
A. L. ROSENMUND
BY
Blair, Curtis + Dunne
ATTORNEYS.

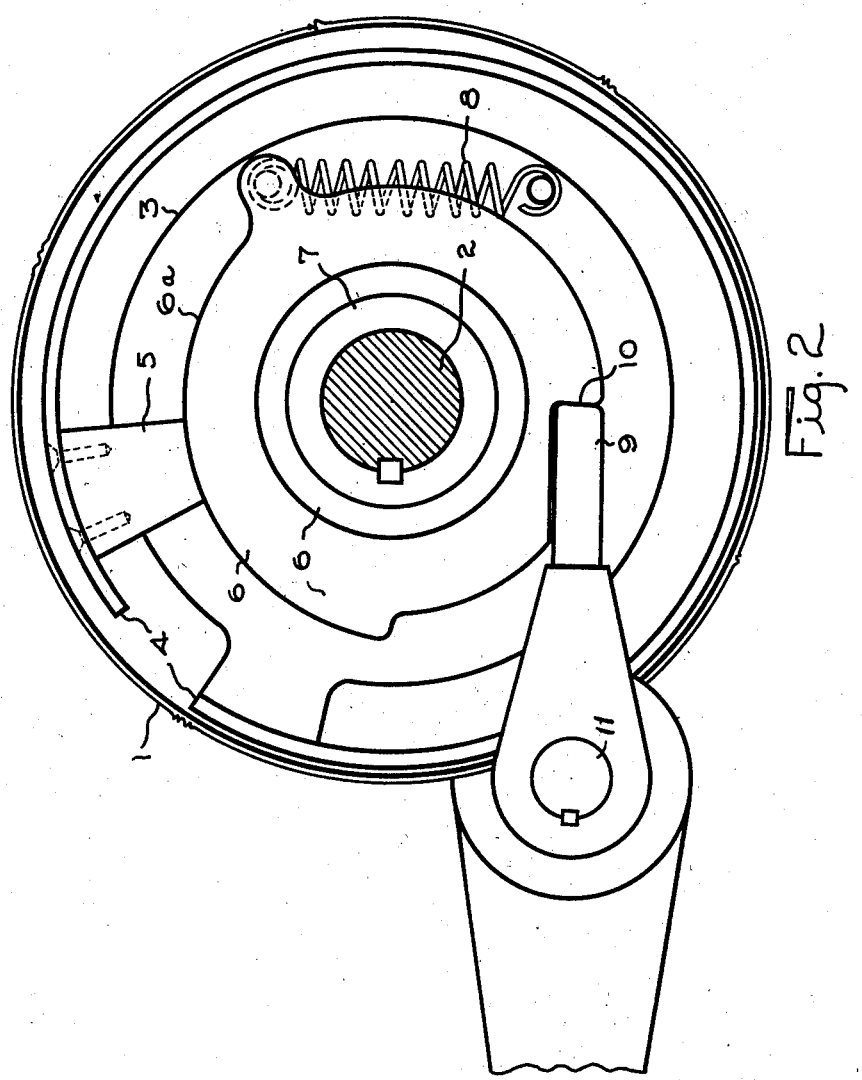

UNITED STATES PATENT OFFICE 2,153,007

CLUTCH MECHANISM

Alfred L. Rosenmund, Rockaway, N. J., assignor to Stapling Machines Co., a corporation of Delaware Original application October 3, 1934, Serial No. 746,655. Divided and this application December 16, 1935, Serial No. 54,595. In Canada August 8, 1935

5 Claims. (Cl. 192—26)

This invention relates to clutch mechanisms and particularly to mechanisms for clutching a driving drum to a driven shaft.

It is an object of the invention to provide a clutch assembly which consists of few parts, is economical to manufacture, is durable, is positive in its action, and which requires comparatively a small force to operate.

One illustrative embodiment of the invention is shown in the accompanying drawings, in which:—

Figure 1 is a side elevation of a driving drum and a clutch assembly embodying the invention and showing the parts in clutching engagement.

Fig. 2 is a similar view but showing the parts in non-clutching position.

Fig. 3 is a sectional view taken on the line 3—3 of Fig. 1.

In the drawings, the driving drum is designated 1 and the driven shaft is designated 2. Keyed to the shaft 2 is a clutch collar 3 which is secured to one end of a clutch band 4. Secured to the other end of the clutch band 4 is a block 5 which bears against the peripheral surface of a collar 6 loosely mounted on a hub 7 of clutch collar 3. Collar 6 is connected to collar 3 by a spring 8 which normally holds collar 6 in the position shown in Fig. 1. In this position, the cam-like peripheral surface 6ª of collar 6 acting through the block 5 forces clutch band 4 into clutching contact with drum 1.

For moving collar 6 against the action of spring 8 to release the pressure on block 5 and break the clutch connection between the band 4 and the drum 1, a buffer arm 9 is provided to engage a shoulder 10 of the collar 6.

As shown in Fig. 2, when the buffer 9 comes in contact with shoulder 10, collar 6 is moved against the action of spring 8, thus moving collar 6 from the position shown in Fig. 1 to the position shown in Fig. 2 and permitting the clutch band 4 to move inwardly and out of contact with the drum 1.

Buffer 9 is fixed to a rock shaft 11 journaled in the frame of any machine in which the clutch mechanism is employed. One such machine is disclosed in my copending application Serial No. 746,655 filed October 3, 1934, of which this application is a division. The operation of the buffer 9 is fully described in said copending application.

It should be noted that because of the cam action of the collar 6ª on the block 5 very little force is required in the spring 8 to move that end of the clutch band 4 against drum 1 and that the clockwise force of drum 1 again clutch band 4 tends to expand the band 4, thus increasing the friction and driving power and exerting a self-energizing effect.

It should be noted also that the clutch band 4 is thin and flexible and substantially coextensive with the inner periphery of the drum and that the cam 6 which is moved in a clockwise direction, i. e., in the direction of rotation of the drum—forces the rear end of clutch band 4 into engagement with drum 1 and that after this initial engagement between the rear end of the band 4 and the drum 1 the movement of the drum will immediately expand the flexible band 4 throughout its entire length and thus produce an increasing frictional pressure many times greater than the initial pressure applied by the spring 8. Because of this arrangement the spring 8 which moves the cam 6 need only be strong enough to move the rear end of band 4 into contact with the drum 1. Thereafter the moving drum acting on the rear end of the band expands the band and forces it into clutching engagement with the drum throughout the entire length of the band.

The expression "rear end of the clutch band" as used in the specification and claims means the rear end of the clutch band in its direction of movement with the drum, i. e., in a clockwise direction in the illustrative device.

The operation of the clutch assembly should be clear from the foregoing description. With the parts shown in the position in Fig. 2, the buffer 9 is rocked out of contact with the shoulder 10. Thereupon spring 8 moves collar 6 from the position shown in Fig. 2 to the position shown in Fig. 1. This movement of collar 6 through the action of its cam surface against block 5 forces clutch band 4 into clutching engagement with drum 1. So long as buffer 9 is held out of engagement with shoulder 10, the driving drum 1 will continue to rotate driven shaft 2. When, however, buffer 9 is moved into the path of rotation of shoulder 10 it will engage the shoulder and stop rotation of the collar 6. Continued movement of block 5 will move it toward the low point of cam surface 6ª of collar 6, thus permitting clutch band 4 to move away from drum 1 and break its clutching engagement therewith.

It will be understood that the invention is not to be limited to the specific embodiment shown for purposes of illustration as the invention may be variously embodied without departing from the invention.

It will also be understood that all of the inventive features need not be used conjointly as they may be used in various combinations as defined in the sub-joined claims.

I claim:

1. In combination with a driving drum and a driven shaft, clutch mechanism comprising a flexible clutch band, a block secured to the rear end thereof, a clutch collar secured to the other end of the clutch band and keyed to the driven shaft, a second clutch collar rotatably mounted on the hub of the first clutch collar and having a cam surface to engage the block, a spring connection between the two collars to press the cam surface of the second collar against the block to force the clutch band into clutching engagement with the drum, and means to move the second clutch collar against the action of the spring to release the pressure on the clutch band.

2. In combination with a driving drum and a driven shaft, a clutch mechanism comprising a flexible clutch band, a clutch collar secured to the front end of the clutch band and keyed to the driven shaft, a second clutch collar rotatably mounted on the hub of the first clutch collar and having a cam surface engaging the rear end of the clutch band, a spring connection between the two collars to cause the cam surface of the second clutch collar to press the rear end of the clutch band toward the drum, and means to move the second clutch collar against the action of said spring to release the pressure on the clutch band.

3. Means for clutching a driving drum to a driven shaft comprising, a flexible clutch band, a clutch collar keyed to the driven shaft and secured to the front end of the clutch band, a second clutch collar rotatably mounted on a hub of the first clutch collar and having a cam surface adapted to engage the rear end of the clutch band, spring means connecting the two collars and normally pressing the cam surface against the rear end of the clutch band to force it into clutching engagement with the drum, and means for moving the second clutch collar against the action of the spring means to release the pressure on the clutch band.

4. In combination with a driving element and a driven element, clutch mechanism comprising a flexible clutch band the front end of which is connected to the driven element and the rear end of which carries a block, and means to move said band into and out of clutching engagement; said means including a cam member rotatable about the driven element and adapted when in one position to engage the block and force the rear end of the band into clutching engagement with the driving element, and means to control the movement of the cam member.

5. In combination with a driving drum and a driven shaft, clutch mechanism comprising a flexible clutch band located within the driving drum and having an over-all length which is less than the inside circumference of the drum, means connecting the driven shaft to the clutch band at a point adjacent the forward end of the clutch band while leaving the clutch band free of connection with the driven shaft rearwardly of said point of connection, and cam means operable adjacent the rear end of the clutch band to press the band at that point against the driving drum whereby movement of the driving drum will force the clutch band into clutching engagement with the driving drum between the point of application of the pressure and the point of connection to the driven shaft.

ALFRED L. ROSENMUND.

CERTIFICATE OF CORRECTION.

Patent No. 2,153,007.   April 4, 1939.

ALFRED L. ROSENMUND.

It is hereby certified that error appears in the printed specification of the above numbered patent requiring correction as follows: Page 1, first column, line 53, for "$6^a$" read 6; same page, second column, line 1, for the word "again" read against; lines 8 and 19, for "cam 6" read cam $6^a$; and that the said Letters Patent should be read with this correction therein that the same may conform to the record of the case in the Patent Office.

Signed and sealed this 16th day of May, A. D. 1939.

Henry Van Arsdale

(Seal) Acting Commissioner of Patents.